United States Patent [19]

Holmen

[11] 4,006,636
[45] Feb. 8, 1977

[54] METHOD AND APPARATUS FOR EXACT MEASUREMENT OF PRESSURES BY MEANS OF LEVEL OR PRESSURE MEASURING EQUIPMENT OF THE BUBBLE TUBE TYPE

[75] Inventor: Hans Kristian Holmen, Voyenenga, Norway

[73] Assignee: Lehmkuhl A/S, Oslo, Norway

[22] Filed: July 7, 1975

[21] Appl. No.: 593,533

[30] Foreign Application Priority Data

July 5, 1974 Norway .................................. 742463

[52] U.S. Cl. ................................................. 73/302
[51] Int. Cl.[2] .......................................... G01F 23/16
[58] Field of Search ..... 73/302, 407, 439, 88.55 D; 318/482; 200/11 D

[56] References Cited

UNITED STATES PATENTS

| 3,023,619 | 3/1962 | Sandford | 73/302 X |
|---|---|---|---|
| 3,286,144 | 11/1966 | Hill | 318/482 X |
| 3,729,997 | 5/1973 | Luke | 73/302 |
| 3,739,315 | 6/1973 | Kurtz et al. | 73/88.5 SD X |
| 3,834,236 | 9/1974 | Durin | 73/302 |
| 3,863,079 | 1/1975 | Calabrese | 200/11 D X |

Primary Examiner—Richard C. Queisser
Assistant Examiner—Daniel M. Yasich
Attorney, Agent, or Firm—Wenderoth, Lind & Ponack

[57] ABSTRACT

The invention relates to a method and apparatus for exact measurement of pressures by means of level or pressure measuring equipment of the bubble tube type. The equipment comprises a bubble tube, a source of pressure, a pressure transducer, and valves which are controlled by a sequence switch means. The invention is characterized in that immediately prior to taking a measurement the source of pressure is connected to the bubble tube for expelling possible liquid therein and in that the source of pressure is then disconnected from the bubble tube. The pressure transducer is connected to the bubble tube during a measuring interval of short duration.

22 Claims, 3 Drawing Figures

METHOD AND APPARATUS FOR EXACT MEASUREMENT OF PRESSURES BY MEANS OF LEVEL OR PRESSURE MEASURING EQUIPMENT OF THE BUBBLE TUBE TYPE

BACKGROUND OF THE INVENTION

This invention relates to a method and apparatus for exact measurement of pressures by means of level or pressure measuring equipment of the bubble tube type. Such equipment in principle comprises a bubble tube, a source of pressure, a pressure transducer, and valves controlled by a sequence switch. An important use of such equipment is for monitoring the water level in water-courses and reservoirs for hydro-electric power generation, in which it is of much great importance to obtain exact and reliable data regarding the reservoir content and variations therein.

In the above use, which is of particular interest in connection with this invention, strict requirements to such level measurement are set also for the reason that the measuring equipment or installations are as a rule located high in the mountains at places to which access is difficult and where periods of time may pass between times at which inspection and maintenance and possibly repairs can take place.

Even though the invention has resulted from the particular requirements of the above use and associated measuring problems, the solutions of the present invention are not restricted to this use, but can, of course, be used also in other fields in which corresponding requirements and needs with respect to measurement of pressures or level exist, for instance in large storage tank installations or in tankers.

Specific problems associated with measurements of this type partly relate to the economic utilization and simplification of the source of pressure, and in part to circumstances concerning the sensing element of the pressure transducer which in view of the requirements as to accuracy must have a very high sensitivity and therefore is subject to deterioration or damage upon adverse influence. Another consideration which is important when using bubble tubes for accurate measurements, is that the tubes employed in many instances will be subject to fouling and other depositions which over a period of the time can lead to a highly reduced flow cross-sectional area in the tubes.

SUMMARY OF THE INVENTION

The basis of the present invention, which provides a solution to the above discussed particular problems, includes the concepts that immediately prior to taking a measurement the source of pressure is connected to the bubble tube for expelling possible liquid therein, that the source of pressure is then disconnected from the bubble tube, and that the pressure transducer is then connected to the bubble tube during a measuring interval of short duration.

This solution involves a number of advantages of which the most significant are:

a. The air consumption is very low.
b. The pressure transducer is under pressure only during short measuring intervals and is otherwise relieved, whereby sag or creep phenomena in the delicate pressure transducer are avoided.
c. The measurement is carried out with a static pressure condition in the bubble tube so that possible cross-sectional restrictions therein cannot represent any source of error.
d. Simplification of the installation is possible in particular thereby that only one bubble tube and an inexpensive, but at the same time reliable source of pressure, can be used.

BRIEF DESCRIPTION OF THE DRAWINGS

The invention, including the apparatus and method thereof, will be explained in more detail in the following description, taken with reference to the accompanying drawings, wherein.

DETAILED DESCRIPTION OF THE INVENTION

Figure 1:
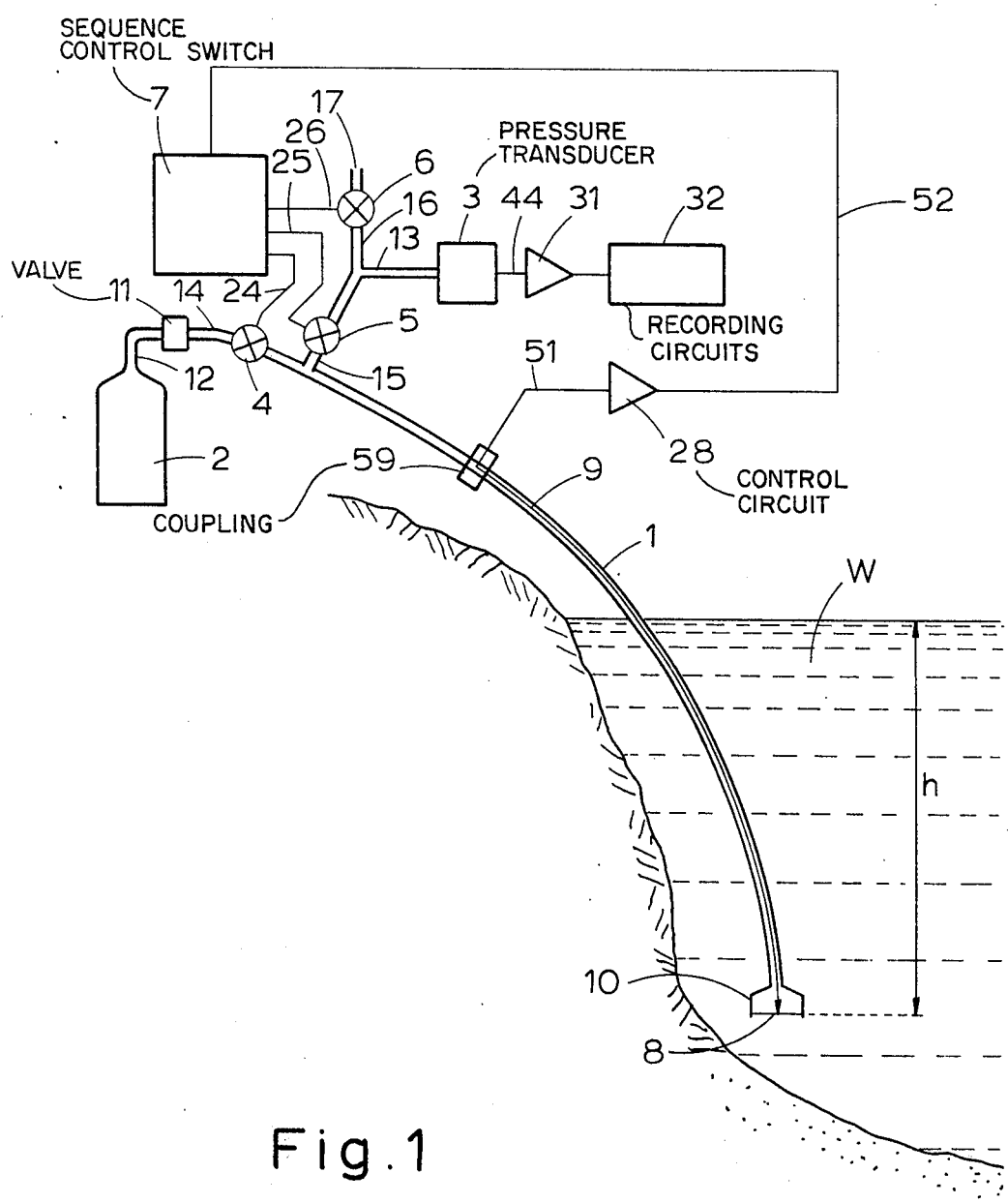
FIG. 1 is a schematic view of an apparatus for carrying out the method according to the invention.

In FIG. 1 there is shown a portion of a water reservoir in which the water mess is designated W and into which there is immerged a bubble tube 1 to a level h beneath the surface of the water W. Through a valve 4 the upper end of the bubble tube 1 can be connected to a source of pressure in the form of a pressure vessel or bottle 2 of standard type. Between the valve 4 and the pressure vessel 2 there is inserted a pressure reducing valve 11. The upper end of the bubble tube 1 is moreover adapted to be connected via another valve 5 with an inlet tube 13 to a pressure transducer 3. The input to the pressure transducer further is adapted to be connected to the ambient atmosphere or reference pressure 17 through a third valve 6. The valves 4, 5 and 6 are of such design that their opening and closing sequences can be controlled, for instance electrically. So-called solenoid valves are well suited for this purpose.

Opening and closing of the valves 4, 5 and 6 is controlled by means of an electrical sequence control switch 7 which has output leads 24, 25 and 26 connected to respective valves 4, 5 and 6. It is explained below how the sequence switch 7 controls the valves in order to carry out level or pressure measurement according to the method of this invention.

The measuring apparatus as such, in addition to the pressure transducer 3, comprises an amplifier 31 for the output signal from the pressure transducer and recording circuits 32 for presenting or recording the measured level or pressure valves.

Figure 2:
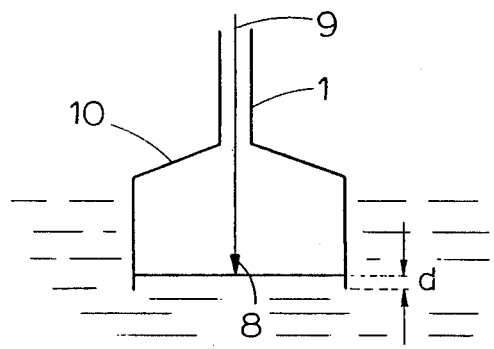
FIG. 2 is a somewhat enlarged schematic view of the lower end of a bubble tube in the apparatus of FIG. 1.

In FIG. 1 and in more detail in FIG. 2 there is, moreover, shown an electrode 8 at the lower end of the bubble tube 1. The electrode 8 is, through an electrical signal wire 9 and an input lead 51, connected to the input of a control circuit 28 which through its output lead 52 is adapted to carry a signal from the electrode 8 to the sequence switch 7. The function of this signal will be explained more closely below.

FIG. 2 shows in more detail how the bubble tube 1 has an enlargement 10 as known per se at its lower end. The electrode 8 terminates at a short distance d above the lower edge of the enlargement 10 of the bubble tube 1. The signal wire 9 and the electrode 8 are included in an electrical circuit which is closed by water when water extends into the enlargement 10 by a distance such that the water contacts the electrode 8. There will then be established a current path from the electrode 8 through the water to the enlargement 10 and further through the bubble tube 1 which thereby in a favourable way is included in the electric circuit mentioned.

The purpose of the above discussed electric circuit including the electrode 8, is to prevent unnecessary expelling of air through the bubble tube 1 from the pressure vessel 2, which is related to the fact that it is desired to reduce the air consumption as much as possible in order to eliminate inspection of the installation for long time periods at the same time as operation and installation costs will be at a minimum, among other reasons because there is no need for a compressor. As will be shown more closely below, it will then normally not be provided that air is expelled through the bubble tube 1 in order to remove water therefrom or from the enlargement 10, unless the electrode 8 is in contact with the water.

It is also to be noted that the wire 9 extends interiorly of the bubble tube 1 up to a point above the maximum water level, and at such position by means of a connecting box 59 or the like, is taken out to the lead 51. Electrode 8 is preferably made of platinum, and the distance d in practice can be for instance 2 – 4 mm.

Level measurement in water courses or power plant reservoirs is normally carried out once each day. In the time between measurements it is important that the bubble tube 1 be substantially filled with air and not contain water. During the actual measuring stage it is essential that there be no movement in the air mass in the bubble tube 1 and the parts of the measuring system connected thereto, which might be the cause of measuring errors as mentioned above. Besides, it is an essential requirement that the bubble tube be completely filled with air during the actual measuring stage, i.e. so that the pressure sensed is exactly referenced to the lower edge of the enlargement 10 of the bubble tube 1.

In the following table I there is given a schedule for sequential operation of the apparatus thus far described, in order to illustrate how the method according to the invention can be carried out in practice in an advantageous manner. For the respective valves 4, 5 and 6 and for the pressure transducer 3 there is indicated in the table by means of symbols 0 and 1 whether the component concerned is activated or not, i.e. with respect to the valves 0 means that the valve is closed, whereas 1 means an open valve. The various stages or phases during operation of the apparatus are described in the first two columns in which phases A-B and C-D constitute periods of rest (stand-by) between each measurement, whereas the various phases included in the actual measuring process are designated with letters E to M. In the right-hand column the duration of the various phases is indicated.

In the rest period there are indicated two expelling phases B and D during which the valve 4 is open, so that expelling of possible water which has come into the bubble tube 1, can take place by means of air from the pressure vessel 2. At the same time valve 6 is open, so that the pressure transducer 3 is vented and stabilized in order to prevent undesired pressure build-up and loading of the sensitive components therein. It is obvious that this latter function is per se independent of the expelling function, but the control by means of the sequence switch 7 is simplified when these two operations are effected simultaneously. The expelling phases B and D are, moreover, initiated by means of signals from the platinum electrode 8 through the control circuit 28, so that expelling takes place only when the electrode is in contact with the water. Superfluous consumption of air during the rest period is thereby avoided.

TABLE I

| Phases | Valve 4 | Valve 5 | Valve 6 | Pressure Transducer 3 | Duration |
|---|---|---|---|---|---|
| (A) Rest period (stand-by) | 0 | 0 | 0 | 0 | 1 min.–1 h |
| (B) Expelling | 1 | 0 | 1 | 0 | Abt. 10 sec. |
| (C) Rest period | 0 | 0 | 0 | 0 | 1 min.–1 h |
| (D) Expelling | 1 | 0 | 1 | 0 | Abt. 10 sec. |
| (E) Stabilizing | 0 | 0 | 1 | 0 | Abt. 10 sec. |
| (F) Rec.atm.pheric Pressure | 0 | 0 | 1 | 1 | Abt.0,1 sec. |
| (G) Expelling | 1 | 0 | 0 | 0 | Varies |
| (H) Filling | 1 | 1 | 0 | 0 | " |
| (I) Stabilizing | 0 | 1 | 0 | 0 | 1–10 sec. |
| (K) Measuring | 0 | 1 | 0 | 1 | Abt. 0,1 sec. |
| (L) Releaving | 0 | 0 | 1 | 0 | Abt. 10 sec. |
| (M) New Rest Period | 0 | 0 | 0 | 0 | 1 min.–1 h |

As shown in Table I the time between each expelling B and D may vary according to the circumstances in the actual installations, but when only one measurement is taken each day, there will in any case be effected a quite large number of expelling operations in order to keep the buble tube 1 free from water between each measurement.

The actual measurement procedure is effected during phases E to M in Table I by means of the sequence switch 7. First the pressure transducer 3 is stabilized (E) by opening the solenoid valve 6 to the atmosphere. Thereafter (F) the atmospheric pressure is recorded by activation of the pressure transducer 3 while the valve 6 is open. The atmospheric pressure thereby recorded shall later be employed for obtaining a very accurate measurement valve. During phase G there is then provided for expelling of the bubble tube 1 by opening of valve 4. This phase shall make sure that the bubble tube 1 and the whole enlargement 10 is filled with air so that the measurement is exactly referred to the lower edge of the enlargement 10. Then during phase H there is provided for filling of that part of the measuring system which is between the upper end of the bubble tube 1 and the pressure transducer 3, i.e. by opening the valve 5 at the same time as the valve 4 is open. When this has been done, the valve 4 is closed (phase I) for stabilizing the whole air mass in the bubble tube 1, the branch tube 15 to the valve 5 and in the tubes 13 and 16 which communicate with the pressure transducer 3. Thereby a completely static pressure condition is obtained without any air flow in any part of the system. Then there is time for the actual recording of the pressure value during phase K in which the pressure transducer 3 is activated during the shortest possible time for detecting the pressure at the end of the bubble tube 1, while the complete electrical measuring arrangement described in association with the pressure transducer enters into function.

Immediately thereafter the pressure transducer 3 is relieved by opening of the valve 6 (phase L). This terminates the actual measuring procedure and a new rest period is initiated with phase M in which all valves are closed and the pressure transducer 3 is inactivated.

The resulting measurement valve is formed thereby that the atmospheric pressure indicated during phase F is subtracted from the water pressure indicated during phase K. This immediate correction leads to a measurement result being independent of changes, for instance ageing in the amplifier 31 and zero-point variations therein and in the pressure transducer 3.

In connection with the above discussed measuring procedure it is remarked that modifications thereof are possible within the scope of this invention. It is essential, however, that the pressure vessel 2 is disconnected from the bubble tube 1 prior to the actual measuring stage, that a stabilizing interval is involved in order to obtain a static pressure condition in the system, and that the pressure transducer is then connected to the bubble tube during a measuring interval of short duration. Higher accuracy and reduced stressing of the sensitive components of the pressure transducer is obtained, however, by including also other of the phases described, such as phases F and L.

Figure 3:
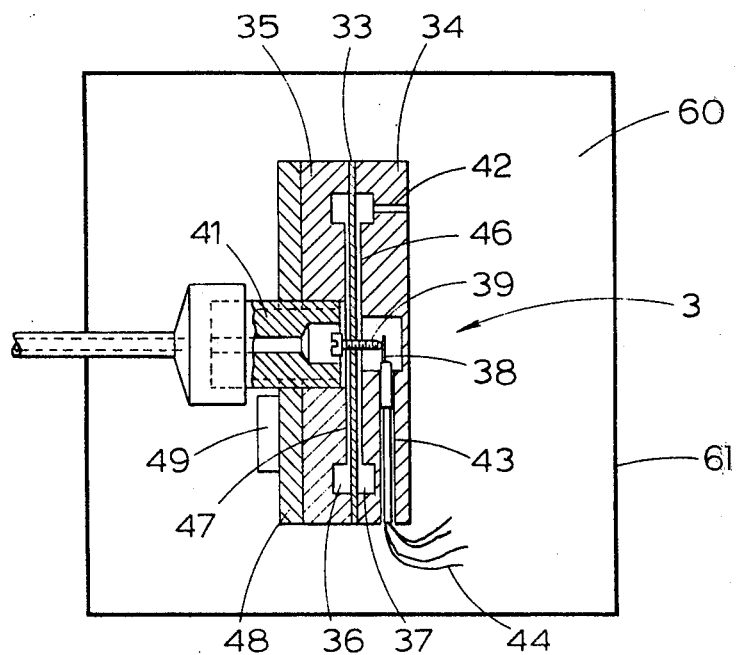
FIG. 3 is a cross-section through an embodiment of a pressure transducer for use in the apparatus.

As will appear from the above description, the pressure transducer 3 constitutes a very important part of the apparatus. A preferred embodiment of this pressure transducer is shown in FIG. 3. The pressure transducer 30 in FIG. 3 is based upon a sensing element in the form of a semiconductor strain gauge 38 of the beam type. Advantageously this component can be of the type described in a leaflet designated AE 470/1 from the Norwegian firm Akers Electronics. In the exemplary embodiment shown in FIG. 3 such a semiconductor strain gauge 38 is mounted in a housing member 34 so that it can be actuated by a membrane 33 through a rod shaped member 39 which can be adjusted in its longitudinal direction and which is attached to the middle portion of the membrane 33. This membrane is clamped between the housing member 34 and another corresponding housing member 35, the joint therebetween being preferably at least in part provided for by means of an adhesive. A tube piece 41 serves to connect the pressure transducer 30 into the measuring system. The semiconductor strain gauge 38 is mounted in a radial bore 43 in the housing member 34 and the leads 44 of the strain gauge are taken out through this bore.

At least adjacent the middle portion of the membrane 33 the housing members 34 and 35 have areas 46 and 47 respectively, which serve to limit the deflection of the membrane and thereby the maximum deformation of the semiconductor strain gauge. A venting aperture 42 is provided in the housing member 34 in order to keep the pressure in the space above the membrane 33 equal to the atmospheric pressure.

Because of the preferred specific adhesive joint between the housing members 34, 35 and the membrane 33, the housing members are formed with peripheric grooves 36 and 37 respectively, which serves to receive possible surplus adhesive which may enter into the interior of the pressure transducer during assembly. When using an adhesive method the membrane can be made of rolled material in which the thickness, homogenity and quality can be easily checked. Thermal stresses from possible brazing or welding processes as well as irregular surface stresses resulting from possible machining (for instance turning) are avoided.

It is evident that the housing members 34 and 35 must be so shaped that the structure is sufficiently rigid and stable. The membrane 33 is preferably made of a material having a low mechanical hysteresis, for instance bronze. For obtaining the highest possible accuracy of measurement it is an advantage in consideration of the temperature sensitivity of the semiconductor strain gauge, to arrange the complete pressure transducer in a thermostatically controlled heated chamber which is preferably heat insulated and can have a power transistor as its source of heat.

In FIG. 3 there is shown a copper plate 48 which constitutes a heat shield in good heat conducting contact with a substantial portion of the surface of the housing member 35 so as to distribute the heat from a source of heat 49 mounted on the copper plate. For obtaining the best possible effect of the copper plate 48 this plate is mounted in such a way on the pressure transducer that it is removed as much as possible from the place at which the strain gauge 38 is situated. Moreover, it is an advantage that the source of heat 49 is located as much as possible centrally on the copper plate 48. Around the whole pressure transducer with the heating arrangement described there is provided an insulating enclosure 60. The electrical power being supplied to the source of heat 49 is controlled by a substantially linear control circuit (not shown) in conventional manner. In addition to the particular heat insulating enclosure 60 surrounding the pressure transducer the remaining electrical measuring apparatus can also have a surrounding heat insulation (not shown).

Various parts of the equipment or installation shown in FIG. 1 have not been discussed in detail above. This for instance applies to the sequence switch 7, the control circuit 28 and the recording circuit 32. These, however, are components and circuits which in the first place may be of conventional construction and in the second place may have varying form according to how the equipment shall function in the practical installation concerned. Thus, the circuit 32 may be designed for the purpose of presenting the measurement results in a way desired, for instance indication and recording, or there may be involved circuits for digitalizing the measurement result or in other ways for known treatment of the signals. The control circuit 28 shown suitably is in the form of an amplifier for impedance conversion. Moreover, it is possible to control the measuring procedure, for instance via telephone lines, from a central control room so that measurement can be initiated at any desired point of time independently of what has been preset in the sequence switch.

I claim:

1. A method for measuring pressures by the use of level or pressure measuring equipment of the type including a bubble tube having a first end thereof positioned in a body of liquid, a source of pressure connectable to a second end of said bubble tube via a first closeable line, a pressure transducer and recorder connectable to said bubble tube via a second closeable line, said pressure transducer being connectable to a reference pressure source via a third closeable line, said pressure transducer being activated to measure pressure in lines exposed thereto and deactivated to interrupt measurement; said method comprising:

opening said third line and activating said transducer and recorder to thereby measure and record said reference pressure;

closing said third line and deactivating said transducer, and then opening said first line to expose said bubble tube to said source of pressure to expell any liquid from said bubble tube;

opening said second line to expose said second line to said source of pressure;

closing said first line and stabilizing the pressure in said bubble tube and said second line for a time sufficient to achieve a static pressure condition therein;

activating said pressure transducer and recorder for a measuring interval of short duration, thereby measuring the static pressure in said bubble tube and said second line, and obtaining a desired measurement as the difference between said reference pressure and said static pressure; and immediately after said measuring interval, deactivating said pressure transducer and recorder, closing said second line, and opening said third line to expose said pressure transducer to said reference pressure and to thereby relieve said pressure transducer.

2. A method as claimed in claim 1, further comprising opening and closing all said lines and activating and deactivating said pressure transducer and recorder by means of a sequence control switch.

3. A method as claimed in claim 1, wherein the measuring operation is conducted at spaced time intervals; and further comprising, between the thus spaced measuring operations, expelling from said bubble tube liquid which may enter therein, said last-mentioned step of expelling comprising opening said first line to expose said bubble tube to said source of pressure in response to detection of liquid in said bubble tube by a liquid sensing device positioned in said bubble tube adjacent said first end thereof.

4. A method as claimed in claim 3, further comprising, simultaneously with said last-mentioned step of expelling, opening said third line to expose said pressure transducer to said reference pressure.

5. A method as claimed in claim 1, wherein said reference pressure source comprises the surrounding atmosphere.

6. A method as claimed in claim 1, wherein all said lines are opened and closed by operating separate valves positioned therein.

7. A method for measuring pressures by the use of level or pressure measuring equipment of the type including a bubble tube positioned within a body of liquid, a source of pressure connectable to said bubble tube, and a pressure transducer and a recording means connectable to said bubble tube, said pressure transducer being connectable to a reference pressure source; said method comprising:

connecting said pressure transducer to said reference pressure source and measuring said reference pressure;

disconnecting said pressure transducer from said reference pressure source, and connecting said source of pressure to said bubble tube to thereby expell any liquid from said bubble tube;

connecting said pressure transducer to said bubble tube while said source of pressure is connected thereto;

disconnecting said source of pressure, and stabilizing the pressure in said bubble tube and to which said pressure transducer is exposed, thereby obtaining a static pressure; and briefly activating said pressure transducer to measure said static pressure, and obtaining a desired measurement as the difference between said reference pressure and said static pressure.

8. A method as claimed in claim 7, further comprising deactivating said pressure transducer, disconnecting said pressure transducer from said bubble tube, and connecting said pressure transducer to said reference pressure source.

9. A method as claimed in claim 8, wherein said steps of connecting and disconnecting and activating and deactivating are achieved by operation of a sequence control switch.

10. A method as claimed in claim 8, wherein the measuring operation is conducted at spaced time intervals; and further comprising, between the thus spaced measuring operations, expelling from said bubble tube any liquid therein, said last-mentioned step of expelling comprising connecting said source of pressure to said bubble tube in response to detection of liquid in said bubble tube by a liquid sensing device positioned therein.

11. A method as claimed in claim 10, further comprising, simultaneously with said last-mentioned step of expelling, connecting said pressure transducer to said reference pressure source.

12. A method as claimed in claim 8, wherein said reference pressure source comprises the surrounding atmosphere.

13. A pressure measuring system comprising:

a bubble tube having a first end positionable in a body of liquid;

a source of pressure connected to a second end of said bubble tube by a first closeable line;

pressure transducer means, connected to said bubble tube by a second closeable line, for transducing pressures in lines exposed thereto into signals representative of such pressures;

a third closeable line connecting said pressure transducer means to a reference pressure source;

recorder means, connected to said pressure transducer means for receiving signals therefrom and for generating measurements of said signals; and sequence control switching means, connected to said lines and to said pressure transducer means, for sequentially:

opening said third line and activating said pressure transducer means and said recorder means to thereby measure and record said reference pressure;

closing said third line and deactivating said pressure transducer means, and then opening said first line to expose said bubble tube to said source of pressure to expell any liquid from said bubble tube;

opening said second line to expose said second line to said source of pressure;

closing said first line and stabilizing the pressure in said bubble tube and said second line for a time sufficient to achieve a static pressure condition therein;

activating said pressure transducer means and said recorder means for a measuring interval of short duration, thereby measuring the static pressure in said bubble tube and said second line, and obtaining a desired measurement as the difference between said reference pressure and said static pressure; and deactivating said pressure transducer means and said recorder means, closing said second line, and opening said third line to expose said pressure transducer means to said reference pressure and to thereby relieve said pressure transducer means.

14. A system as claimed in claim 13, further comprising liquid sensing means, positioned within said bubble tube at a position adjacent said first end thereof and connected to said sequence control switching means, for operating said sequence control switching means upon the detection of liquid within said bubble tube to open said first line to expose said bubble tube to said source of pressure to expell said liquid therefrom.

15. A system as claimed in claim 14, wherein said liquid sensing means comprises an electrode positioned a predetermined distance above the lowest portion of said first end of said bubble tube.

16. A system as claimed in claim 15, further comprising an electric lead extending from said electrode upwardly through said bubble tube to a position above the upper level of said body of liquid.

17. A system as claimed in claim 13, further comprising separate valves in each of said lines.

18. A system as claimed in claim 13, wherein said pressure transducer means comprises a housing having therein a flexible membrane connected at one side thereof to said second line such that said membrane is flexed due to pressure therein, a semiconductor strain gauge of the beam type positioned in said housing at a second side of said membrane to be contacted by said membrane upon flexure thereof.

19. A system as claimed in claim 18, wherein said housing comprises two housing elements clamping therebetween the periphery of said membrane, said housing elements have therein means to limit the extent of flexure of said membrane.

20. A system as claimed in claim 19, further comprising an adhesive sealing said membrane and housing elements, said housing elements having at the joint thereof with said membrane groove means for accommodating any excess adhesive.

21. A system as claimed in claim 18, further comprising means for heat insulating said pressure transducer means from the surroundings thereof, and electric heating means attached to said housing for controlling the temperature of said pressure transducer means.

22. A system as claimed in claim 21, further comprising a heat distribution plate attached to said housing at a position spaced from said strain gauge, said electric heating means being attached to said heat distribution plate.

* * * * *